United States Patent [19]

Miyata et al.

[11] Patent Number: 5,165,036
[45] Date of Patent: Nov. 17, 1992

[54] PARALLEL PROCESSING DEVELOPMENT SYSTEM WITH DEBUGGING DEVICE INCLUDES FACILITIES FOR SCHEMATICALLY DISPLAYING EXECUTION STATE OF DATA DRIVEN TYPE PROCESSOR

[75] Inventors: Souichi Miyata; Satoshi Matsumoto; Shin'ichi Yoshida; Toshiya Okamoto, all of Osaka; Takeshi Fukuhara, Hyogo; Shinji Komori, Hyogo; Tetsuo Yamasaki, Hyogo; Kenji Shima, Hyogo, all of Japan

[73] Assignees: Sharp Kabushiki Kaisha, Osaka; Mitsubishi Denki Kabushiki Kaisha, Tokyo, both of Japan

[21] Appl. No.: 471,204

[22] Filed: Jan. 29, 1990

[30] Foreign Application Priority Data

Jan. 31, 1989 [JP] Japan ................................. 1-21700
Jan. 31, 1989 [JP] Japan ................................. 1-23570

[51] Int. Cl.⁵ ............................................. G06F 9/00
[52] U.S. Cl. ................................. 395/800; 364/DIG. 1; 364/274; 364/274.1; 364/275.5; 364/228; 364/229.3; 364/191; 371/19
[58] Field of Search ... 364/200 MS File, 900 MS File, 364/191; 395/800; 371/19

[56] References Cited

U.S. PATENT DOCUMENTS

| | | |
|---|---|---|
| 4,621,319 | 11/1986 | Braun et al. ........................ 364/200 |
| 4,751,634 | 6/1988 | Burrus, Jr. et al. ................ 364/200 |
| 4,782,461 | 11/1988 | Mick et al. ......................... 364/900 |
| 4,785,204 | 11/1988 | Terada et al. ...................... 307/451 |
| 4,814,978 | 3/1989 | Dennis ............................... 364/200 |
| 4,819,159 | 4/1989 | Shipley et al. ..................... 364/200 |
| 4,821,178 | 4/1989 | Levin et al. ........................ 364/200 |
| 4,833,605 | 5/1989 | Terada et al. ...................... 364/200 |
| 4,847,755 | 7/1989 | Morrison et al. .................. 364/200 |
| 4,862,347 | 8/1989 | Rudy .................................. 364/200 |
| 4,907,229 | 3/1990 | Edwards et al. ................... 364/200 |
| 4,918,644 | 4/1990 | Terada et al. ...................... 364/900 |
| 4,937,740 | 6/1990 | Agarwal et al. ................... 364/200 |
| 4,953,082 | 8/1990 | Nomura et al. ................... 364/200 |
| 4,953,083 | 8/1990 | Takata et al. ...................... 364/200 |
| 4,979,096 | 12/1990 | Ueda et al. ......................... 364/200 |
| 5,021,947 | 6/1991 | Campbell et al. ................. 364/200 |

Primary Examiner—Thomas C. Lee
Assistant Examiner—Mehmet Geckil
Attorney, Agent, or Firm—Lowe, Price, Leblanc & Becker

[57] ABSTRACT

A parallel processor developing system comprises a control computer, an interface portion, a processing element, a tracer portion and a display portion. The processing element comprises a data driven type processor. The interface portion stores data packets supplied from the control computer and applies the data packets to the processing element at a predetermined time interval. The tracer portion stores the data packets supplied from predetermined ports of the processing element together with time information. The display portion displays storage contents of the tracer portion.

21 Claims, 16 Drawing Sheets

FIG.10A

FP OUTPUT

| NO. | PH | SELC | P | C | GN | OPECODE | NODE#(DECIMAL) | DATA(LEFT) | DATA(RIGHT) | O | LC | PC | TIME |
|---|---|---|---|---|---|---|---|---|---|---|---|---|---|
| 00001 | 10 | 1010 | 0 | 0 | 00 | DEC | 00000(0000000) | 0000000000 | .... | 1 | 1 | 0 | 762B |
| 00002 | 10 | 1010 | 0 | 0 | 00 | INC | 00000(0000000) | 0000000001 | .... | 1 | 0 | 0 | 762E |
| 00003 | 10 | 1010 | 0 | 0 | 00 | CTZ | 00000(0000000) | 0000800008 | .... | 1 | 0 | 0 | 7631 |
| 00004 | 10 | 1010 | 0 | 0 | 00 | ABS | 00000(0000000) | 0040000000 | .... | 1 | 0 | 0 | 7634 |
| 00005 | 10 | 1010 | 0 | 0 | 00 | FABS | 00000(0000000) | 0000000000 | .... | 1 | 0 | 0 | 7637 |
| 00006 | 10 | 1010 | 0 | 0 | 00 | INT | 00000(0000000) | 0000000003 | .... | 1 | 0 | 0 | 763A |
| 00007 | 10 | 1010 | 0 | 0 | 00 | FLOAT | 00000(0000000) | 0041000000 | .... | 1 | 0 | 0 | 763C |
| 00008 | 10 | 1010 | 0 | 0 | 00 | Z | 00000(0000000) | 0000000001 | .... | 1 | 0 | 0 | 763F |
| 00009 | 10 | 1010 | 0 | 0 | 01 | DELAY | 00000(0000000) | 0000000001 | .... | 1 | 0 | 0 | 7642 |
| 00010 | 10 | 1010 | 0 | 0 | 00 | NOP | 00000(0000000) | 0000000004 | .... | 1 | 0 | 0 | 764B |
| 00011 | 10 | 1010 | 0 | 0 | 00 | ACLEAR | 00000(0000000) | 0000000000 | .... | 1 | 0 | 0 | 764B |

FIG.10B

ECS OUTPUT

| NO. | PH | SELC | P | C | GN | OPECODE | NODE#(DECIMAL) | DATA(LEFT) | DATA(RIGHT) | O | LC | RC | TIME |
|---|---|---|---|---|---|---|---|---|---|---|---|---|---|
| 00001 | 00 | 0100 | 0 | 0 | 00 | GET_C | 00000(0000000) | 0000000100 | .... | 0 | 0 | 0 | 2642 |
| 00002 | 00 | 0100 | 0 | 0 | 00 | GET_C | 00000(0000000) | 00FFFFFF01 | .... | 0 | 0 | 0 | 2643 |
| 00016 | 00 | 0100 | 0 | 0 | 00 | CC | 00000(0000000) | 0006000000 | .... | 0 | 0 | 0 | 265D |
| 00019 | 00 | 0100 | 0 | 0 | 00 | PET | 00000(0000000) | 0000000000 | .... | 0 | 0 | 0 | 265F |
| 00020 | 00 | 0000 | 0 | 0 | 00 | SW | 00000(0000000) | 0000000000 | .... | 0 | 0 | 0 | 2661 |
| 00021 | 00 | 0000 | 0 | 0 | 00 | SWC | 00002(0000002) | 0000000000 | .... | 0 | 0 | 0 | 2662 |
| 00023 | 00 | 0100 | 0 | 1 | A5 | PC | 00000(0000000) | 0000000101 | .... | 0 | 0 | 0 | 2663 |

FIG.16

| DESTINATION FIELD | DATA FIELD | TIME FIELD |
|---|---|---|

FIG.17

| ROW No. | PROGRAM |
|---|---|
| 1 | main ( inp ; out ) |
| 2 | input     int   inp; |
| 3 | output    int   out; |
| 4 | { |
| 5 |     int    a = 10; |
| 6 |     int    b = 20; |
| 7 |     int    c = 4; |
| 8 |     int    w, x, y; |
| 9 |  |
| 10 |     x = inp + a + b * c; |
| 11 |     w = c + x; |
| 12 |     y = ( b + c ) * x; |
| 13 |     z = w + x; |
| 14 |     out = z + y; |
| 15 |     return ( out ); |
| 16 | } |

PARALLEL PROCESSING DEVELOPMENT SYSTEM WITH DEBUGGING DEVICE INCLUDES FACILITIES FOR SCHEMATICALLY DISPLAYING EXECUTION STATE OF DATA DRIVEN TYPE PROCESSOR

BACKGROUND OF THE INVENTION

1. Field of the Invention

The present invention relates generally to system for developing parallel processors and a method of developing the same, and more particularly to a system and a method for developing a parallel processor apparatus having a development supporting environment (development supporting tool) in which debugging of hardware and software in the development of a data driven type (data flow type) processor and/or the application system can be easily and rapidly performed.

2. Description of the Background Art

The majority of conventional information processor von Neumann type information processors in which various instructions are stored in advance as programs in program memories, and addresses in the program memories are sequentially specified by a program counter, so that the instructions are sequentially read out to be executed.

On the other hand, a data driven type processor is one type of a non-von Neumann computer not sequential execution of instructions by a program counter. Such a data driven type processor employs architecture based on parallel processing of instructions. In the data driven type processor, immediately after data which are objects of an operation are collected, an instruction can be executed, and a plurality of instructions are simultaneously driven by the data, so that programs are executed in parallel in accordance with the natural flow of the data. As a result, the time required for the operation is significantly reduced.

FIG. 1 is a block diagram showing one example of a structure of a data driven type processor. FIG. 2 shows one example of a field structure of a data packet circulating through each portion of the processor. FIG. 3 shows a part of a field structure of stored contents in a program storing portion.

A destination field of the data packet of FIG. 2 stores destination information, an an instruction field stores instruction information, and a data 1 field or a data 2 field stores operand data.

The processor of FIG. 1 comprises a program storing portion 101, a paired data generating portion 102 and an operation processing portion 103. The program storing portion 101 stores a data flow program shown in FIG. 3. The program storing portion 101 reads the next destination information and the next instruction information by addressing based on the destination information of the inputted data packet of FIG. 2, as shown in FIG. 3, stores the destination information and the instruction information in the destination field and the instruction field in the inputted data packet, respectively, and outputs the same.

The paired data generating portion 102 queues data packets outputted from the program storing portion 101. More specifically, the paired data generating portion 102 detects different two data packets having the same destination information, stores operand data of one of the data packets, for example, the contents of the data 1 field shown in FIG. 2 in the data 2 field of the other data packet, and outputs the other data packet.

The operation processing portion 103 performs a specified operation processing with respect to the data packets outputted from the paired data generating portion 102, stores the result of the operation processing in the data 1 field of the data packet, and outputs the data packet to the above described program storing portion 101.

Meanwhile, the program storing portion 101 and the paired data detecting portion 102 are coupled to each other by data transmission paths 104 and 105. The paired data generating portion 102 and the operation processing portion 103 are coupled to each other by a data transmission path 106. In addition, the operation processing portion 103 and the program storing portion 101 are coupled by a data transmission path 107.

The data packet circulates through the program storing portion 101, the paired data generating portion 102, the operation processing portion 103 in this order, so that operation processing based on the data flow program stored in the program storing portion 101 progresses.

In the above described data driven type processor, immediately after data which are objects of an operation are collected, instruction can be executed, so that programs are executed in parallel and asynchronously in accordance with the natural flow of the data. In case a sequential source program formed so as to be executed in a general von-Neumann computer is developed into a data flow program and executed, the execution order is not always coincident with an execution order in a von Neumann computer. Therefore, errors of the source program can not be detected to be collected simply by tracing the program. In addition, a great difficulty occurs in finding a corresponding relation between the data flow program and the source program.

Furthermore, at a stage of developing a data driven type processor and/or the application system, there might occur a case in which the data flow program could not be executed properly due to errors in the hardware of the data driven type processor itself. When the operation of the data driven type processor is not normal because of some accident, a considerable difficulty accompanies in discriminating whether the cause of the error is of hardware of the data driven type processor itself or of software due to the executed data flow program.

FIG. 4 is a block diagram showing a structure of a conventional development system of the data driven type processor. In FIG. 4, a host personal computer 90 is connected to a system bus 97. A processing portion 100a and a display portion 100b are connected to the system bus 97. The processing portion 100a is connected to the display portion 100b through an image memory bus 98.

The processing portion 100a includes a timer 91, a memory address generator 92 and processors 93a, 93b, 93c and 93d. The display portion 100b comprises a display controller 94 and an image memory 95. A CRT 96 is connected to the image memory 95.

In the development system of FIG. 4, performed are initialization, setting of a break point, dump indication load.setting.transfer of each portion of the memories in the system, input, output, loading of object program.

Initialization, object loading, setting and loading of the memories of each portion and the like are performed by writing data from the host personal computer to each portion. On the contrary, the dump indication is performed by reading the data from each portion to the host personal computer 90. The transfer is carried out by combining these processing. Operation data can be applied from the host personal computer 90.

The above described processings are performed based on the command from the host personal computer 90. A value of the data stored in a memory of each portion in the system is displayed on the CRT 96 by means of the display portion 100b during the execution of the processing or at the end step of the processing by the processing portion 100a.

However, in the development system of FIG. 4, a processing in each processor cannot be traced. Namely, the development system does not have a development supporting environment in which efficiency of debugging in the development of the applied system using a data driven type processor can be improved based on the result of the trace. Accordingly, the applied system using a data driven type processor can not be effectively developed.

SUMMARY OF THE INVENTION

An object of the present invention is to provide a system for developing a parallel processor having a development supporting environment in which debugging of hardware and software in the development of the applied system using a data driven type processor can be efficiently performed at a high speed.

Another object of the present invention is to provide a method of developing a parallel processor capable of efficiently and at a high speed performing debugging of hardware and software in the development of the applied system using a data driven type processor.

A further object of the present invention is to provide a debug device capable of effectively performing debugging of a data flow program and a data driven type processor itself.

A still further object of the present invention is to provide a method by which debugging of a data flow program and a data driven type processor itself can be effectively performed.

A parallel processor developing system according to the present invention comprises a parallel processor, a controller, an input device, a tracer and a display device. The parallel processor includes a plurality of function portions and ports provided at predetermined points of the plurality of function portions and processes data packets. The controller controls the parallel processor and supplies data packets to be processed by the parallel processor. The input device stores the data packets supplied by the controller and inputs the data packets to the parallel processor at a predetermined time interval. The tracer is connected to any of the ports of the parallel processor and stores the data packets taken from the port together with common time information. The display device indicates storage contents of the tracer.

In the parallel processor developing system, the data packets to be processed are inputted by the input device at a high speed corresponding to a processing speed in a practical application and transfer state of the data packet in each function portion of the parallel processor is traced by the tracer while maintaining the execution state by the tracer. In addition, by filing the trace result and make the same into a data flow graph, debugging of the hardware and the software in developing the parallel processor can be efficiently performed at a high speed.

A debug device according to another aspect of the present invention comprises a debug information storing device, an operation packet observing device, a queue packet observing device and an execution state displaying device. The debug information storing device stores debug information regarding the data flow program. The operation packet observing device observes the data packets which have been operated in the operation processing portion of the data driven type processor. The queue packet observing device observes the data packets queueing the data packets to be paired in the paired data generating portion of the data driven type processor. The execution state displaying device schematically displays the execution state of the data driven type processor based on the debug information stored in the debug information storing device and information obtained by the operation packet observing device and the queue packet observing device.

The debug device according to the present invention enables the execution state of the data driven type processor to be visually comprehended. This allows a logical operation of the data flow program executed in parallel and asynchronously in accordance with the natural flow of the data to be easily traced. In addition, in case the data flow program does not function as expected, the causes of the error can be effectively detected.

Accordingly, by using the debug device according to the present invention in the data driven type processor, debugging of the data flow program and the debugging of the data driven type processor itself can be effectively performed, which has been very difficult because the program is executed asynchronously and in parallel.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10A is a diagram showing one example of a result of the trace outputted from an function processing portion.

FIG. 10B is a diagram showing one example of a result of the trace outputted from an external color/stack processing portion.

FIG. 16 is a diagram showing a field structure of a data packet observed in the debug device of FIG. 15.

FIG. 17 is a diagram showing one example of a source program described in sequential languages.

DESCRIPTION OF THE PREFERRED EMBODIMENTS

Embodiments of the present invention will be described in detail with reference to the drawings in the following.

Figure 5:
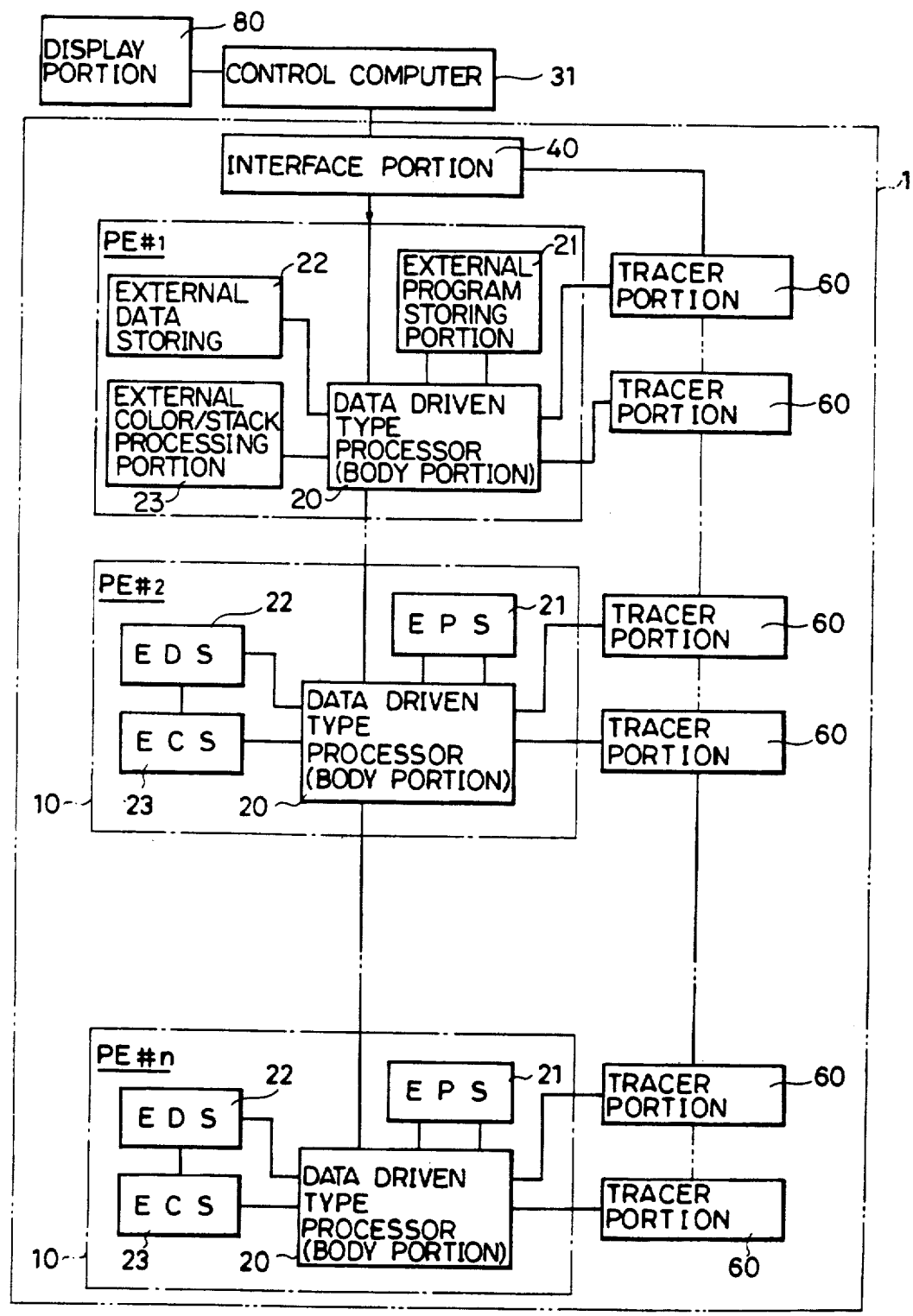
FIG. 5 is a block diagram showing a structure of a parallel processor developing system according to one embodiment of the present invention.

FIG. 5 is a block diagram showing a structure of a parallel processor developing system according to one embodiment of the present invention.

Referring to FIG. 5, a development supporting environment 1 comprises a plurality of processing elements (PE#1-#n) 10, an interface portion 40 and a plurality of tracer portions 60. Hardware of the development supporting environment 1 is comprised of a minimum of 6 boards. Each processing element 10 comprises a data driven type processor (body portion) 20, an external program storing portion (EPS) 21, an external data storing portion (EDS) 22 and an external color/stack processing portion (ECS) 23. Namely, each processing element 10 is comprised of these 4 boards.

An operation of the development supporting environment 1 is controlled by a control computer 31.

Figure 1:
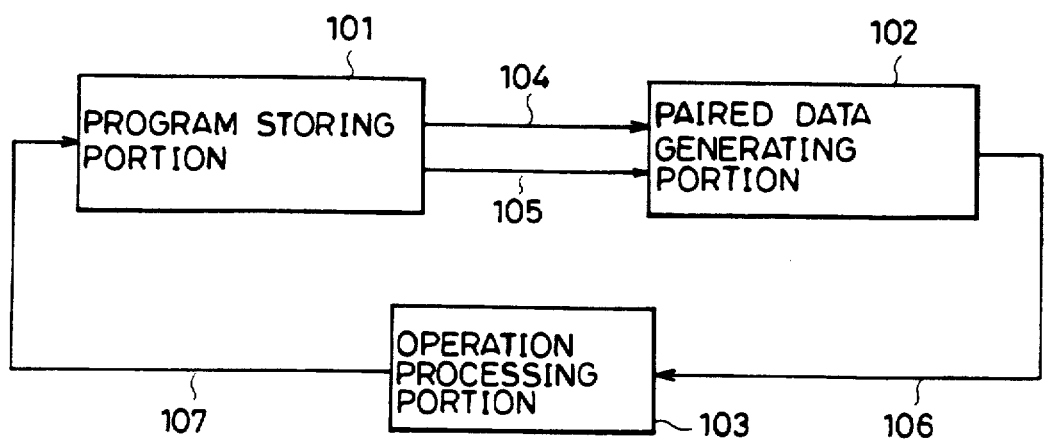
FIG. 1 is block diagram schematically showing a structure of a data driven type processor.
Figure 6:
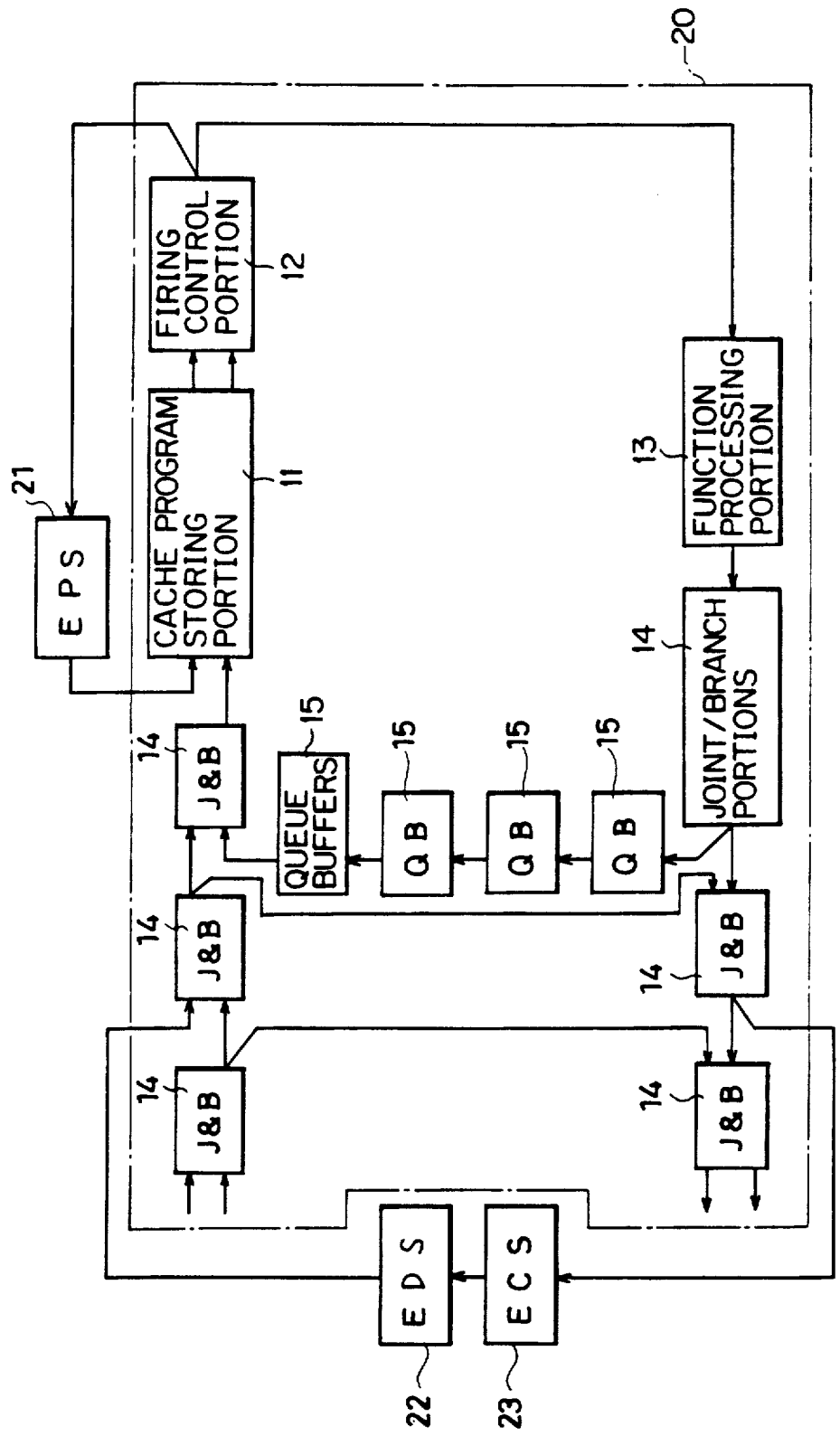
FIG. 6 is a block diagram showing a structure of a processing element.

FIG. 6 shows a structure of each processing element 10. The data driven type processor 20 comprises a cache program storing portion (CPS) 11, a firing control portion (FC) 12, a function processing portion (FP) 13, a joint/branch portions (J/B) 14 and queue buffers (QB) 15. The cache program storing portion 11 corresponds to the program storing portion 101 of FIG. 1. The firing control portion 12 corresponds to the paired data generating portion 102 of FIG. 1. The function processing portion 13 corresponds to the operation processing portion 103 of FIG. 1. The queue buffers 15 correspond to the data transmission path 7 of FIG. 1. The data driven type processor 20 forms a circulation pipeline of the cache program storing portion 11, the firing control portion 12 and the function processing portion 13 together with the joint/branch portions 14 and the queue buffers 15. The external program storing portion 21 is a function portion for storing the external extended program of the cache program storing portion 11. The external data storing portion 22 is a function portion for storing array data and the like. The external color/stack processing portion 23 is a function portion for color control and external queue.

Figure 7:
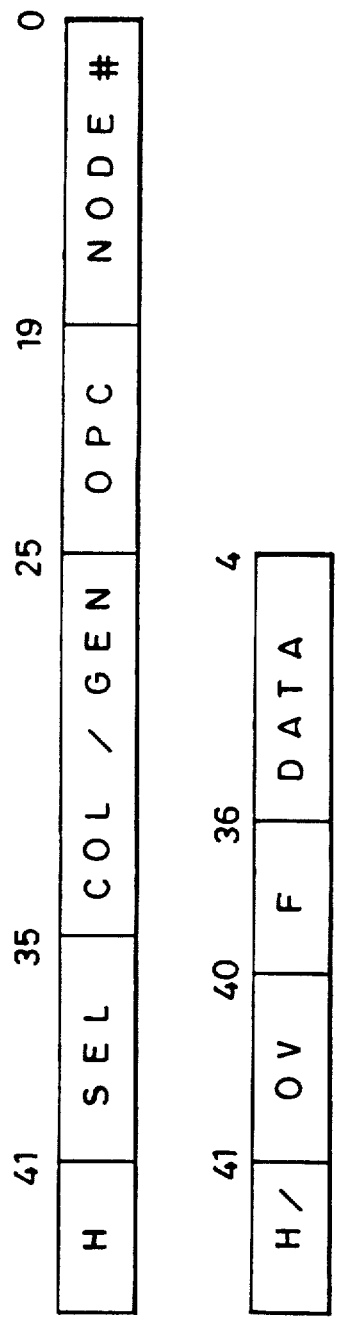
FIG. 7 is a diagram showing a data packet circulating in the processing element of FIG. 6.

Shown in FIG. 7 is a data packet to be processed by the data driven type processor. Each field of the data packet of FIG. 7 stores a first word identifying flag H, a selection code SEL, a color/generation COL/GEN, an operation code OPC, a destination node address NODE#, an overflow flag OV, a flag F of a carry or the like and operand data DATA.

In FIG. 6, an inputted data packet having the format shown in FIG. 7 is inputted in the cache program storing portion 11 through a junction portion in the junction/branch portion 14. The external program storing portion 21 is connected to the cache program storing portion 11. The cache program storing portion 11 takes out the program data which will be necessary in the next place from the external program storing portion 21, using the next destination information of the data packet which has passed through the firing control portion 12 as a trigger. The program data is stored in the cache program storing portion 11. When a monomial operation is performed, the data packet is outputted, without modification, from the firing control portion 12. When a binomial operation is performed, operand pairs are formed in the firing control portion 17, so that the data packet in which these operand pairs are stored is outputted from the firing control portion 12. The data packet outputted from the firing control portion 12 is sent to the function processing portion 13. In the function processing portion 13, an operation with respect to the operand data DATA is carried out based on the operation code OPC stored in the data packet. The data packet storing the result of the operation is outputted from the function processing portion 13. Then, whether the data packet is to be outputted or not is determined by the junction/branch portion 14. In case the data packet is not to be outputted, the data packet is again returned to the cache program storing portion 11 and the same processing continues to be performed.

In executing the program, a matching memory in the firing control portion 12 is hashed in condition that basically processings except for the loop processing are executed starting from that of a lower node number. When hash collision occurs in the matching memory, a data packet of a younger generation and a data packet of a lower node number are stored and the rest of the data packets are sent out to the circulation pipeline or the external color/stack processing portion 23. Namely, at all times data packets having higher priority are sequentially processed, thereby allowing processings to proceed without the clogging of the circulation pipeline in the chip.

The cache program storing portion 11 and the firing control portion 12 are coupled to each other by a data path corresponding to two data paths in other portion of the circulation pipeline. This causes no portion of the data path to be clogged with the data packet even during the copy processing in the cache program storing portion 11.

Control over the entire development supporting environment 1 is carried out by the control computer 31. The control computer 31 applies and collects the data in accordance with a development supporting environment controlling program. A processing mode of the control computer 31 in accordance with the controlling program will be described in the following.

(1) Supply (or setting) mode

Performed are load of program data, load of inputted data packet, setting of the number of inputted data packets, supply of the inputted data packets and supply of packets for dumping.

(2) Collection mode

Performed are setting of a break point comparing value, setting of a break point masking value, activation of a tracer which starts tracing, preset of a trace address counter, writing to a file in a trace memory and reading of break point generating addresses.

In dumping a memory, a start address and an end address are specified for the external data storing portion 22, the firing control portion 12 and the external program storing portion 21 in each processing element 10, so that dump packets outputted from memories included in each processing element 10 are collected in the tracer. In addition, initialization, stand-by of a predetermined time period and return from a controlling program and the like can be performed.

Figure 8:
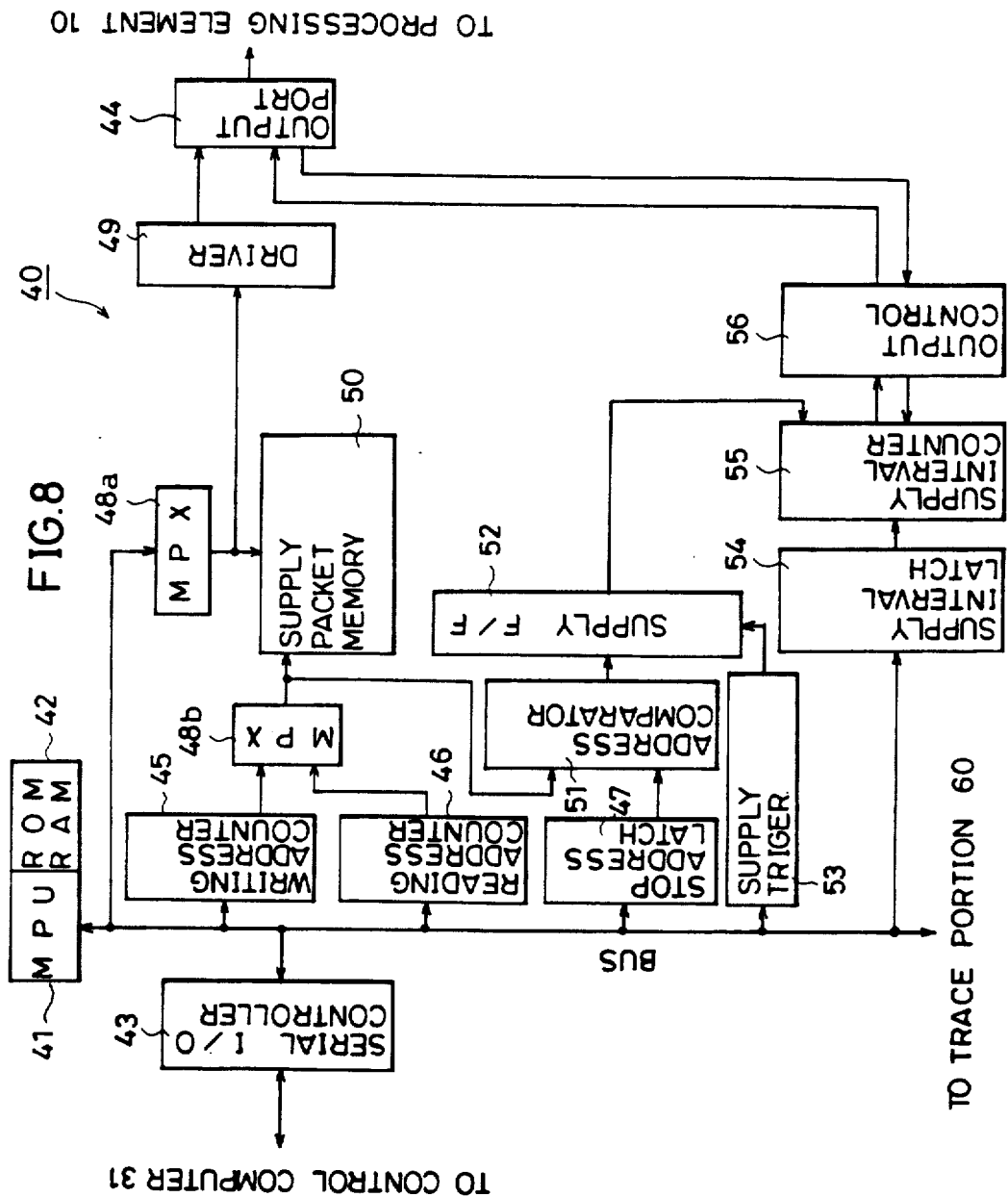
FIG. 8 is a block diagram showing a structure of an interface portion.

FIG. 8 is a block diagram showing a structure of the interface portion 40. A conventional (von Neumann type) microprocessor unit 41 manages the interface portion 40 and the tracer portion 60 (refer to FIG. 5). A ROM and RAM 42 stores program and data for the microprocessor unit 41. The interface portion 40 has a supply packet memory 50 of 4k×64 bits. An address and data bus in the interface portion 40 is connected to the control computer 31 (FIG. 5) through a serial I/O controller (serial port) 43. A data multiplexer 48a for supplying a data packet to the supply packet memory 50 is connected to the bus. Connected to the bus are a writing address counter 45 for addressing to write a data packet into the supply packet memory 50 and a reading address counter 46 for addressing to read a data packet from the supply packet memory 50. Outputs of the writing address counter 45 and the reading address counter 46 are applied to an address multiplexer 48b for the supply packet memory 50. In addition, the supply packet memory 50 is connected to an output port 44 for supplying a data packet into the data driven type processor 20 in the processing element 10 (FIG. 5) through a driver 49. A stop address latch 47 is used to stop the the data packet from outputting from the output port 44. An address comparator 51 compares the address applied to the supply packet memory 50 in the time of the supply of data packets with the addresses stored in the stop address latch 47. An supply flip-flop 52 indicates an supplying state of data packets. A supply trigger generator 53 generates a trigger at the time of starting the supply of a data packet. A supply interval latch 54 stores intervals of packets at the time of the supply of data packet. A supply interval counter 55 measures a supply interval between data packets. An output control portion 56 controls supply of a data packet.

Data is transferred between the control computer 31 and the development supporting environment 1 including the data driven type processor 20 through the interface portion 40 shown in FIG. 8. First, the interface portion 40 initializes the entire development supporting environment 1 at the same time as the supply of power, and thereafter waits for a command from the control computer 31 (FIG. 5). The microprocessor unit 41 performs functions of the above described supply mode and collection mode based on the command applied from the serial I/O controller 43. Writing to two words in the supply packet memory 50 is performed on a data packet basis comprising a tag region and data of 32 bits shown in FIG. 7, and which is outputted from the output port 44 on a data packet basis, so that loading of the program and the data is performed. The supply packet memory 50 is used for the necessity for performing the supply of the inputted data packet at a high speed. In response to the writing address counter 45, a maximum of 4k words of data packets are loaded in the supply packet memory 50. The information corresponding to the number of inputted data packets is set in the stop address latch 47. Thereafter in accordance with the supply command for specifying a supply interval, the reading address counter 46 applies data packets at one stroke until the output of the reading address counter 46 becomes coincident with a value set in the stop address latch 47.

The address and data bus in the interface portion 40 is also connected to the tracer portion 60, so that control of the tracer portion 60 is also performed.

Figure 9:
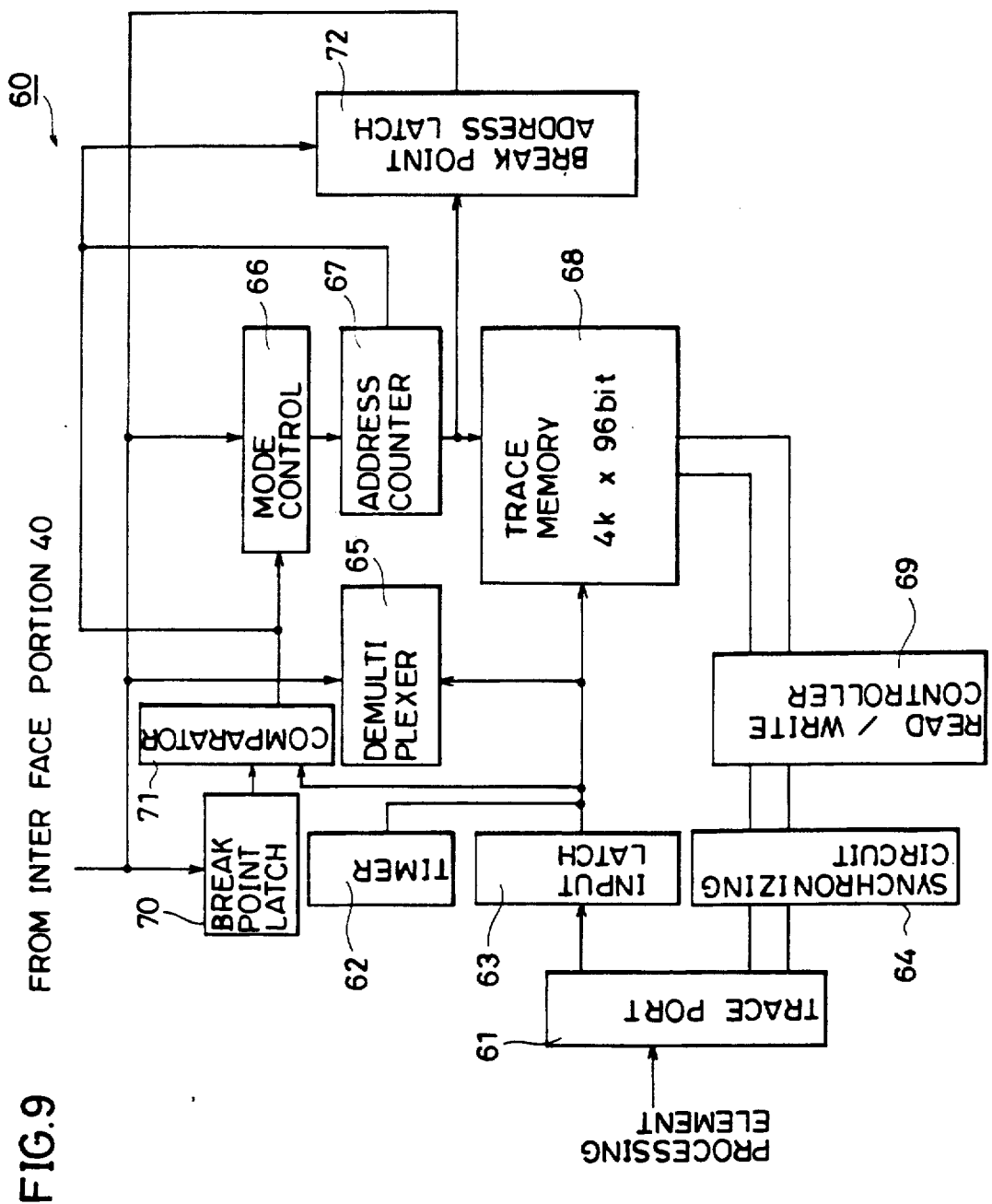
FIG. 9 is a block diagram showing a structure of a trace portion.

FIG. 9 is a block diagram showing a structure of the tracer portion 60. The tracer portion 60 has a trace memory 68 of 4k×96 bits. In addition, the tracer portion 60 is connected to each terminal of the processing element 10, which element can be traced. In addition, the tracer portion 60 is connected to the address and data bus of the interface portion 40, which is directly controlled by the interface portion 40.

A trace port 61 is connected to an input/output port or a data transfer port of the processing element 10. The trace port 61 is connected to a timer 62, a demultiplexer 65, the trace memory 68 and a comparator 71 through an input latch 63. The trace port 61 is also connected to the trace memory 68 through a synchronizing circuit 64 and a read/write controller 69. On the other hand, the address and data bus in the interface portion 40 (FIG. 8) is connected to a break point latch 70, the demultiplexer 65 and a mode control portion 66. The output of the breakpoint latch 70 is applied to the comparator 71. The output of the comparator 71 is applied to the mode control portion 66 and the breakpoint address latch 72. The output of the mode control portion 66 is applied to the trace memory 68 and the breakpoint address latch 72 through an address counter 67.

The tracer portion 60 is directly controlled by the interface portion 40. A comparing value of a breakpoint and mask data can be set in accordance with the necessity. After tracer numbers and trace modes from the interface portion 40 are set, start of the trace is instructed. Thereafter, in the tracer portion 60, the data packet inputted from the trace port 61 is latched in synchronization with an internal clock and stored in the trace memory 68 with time information. If a breakpoint is set in the breakpoint latch 70, an operation thereof is stopped after a data packet coincident with the breakpoint is detected by the comparator 71. At the time of the stop, selection can be made among a direct stop, a stop after half of the memory capacity is traced, a stop after the full amount of the memory capacity is traced. This stores trace history effectively.

After the trace is completed, a breakpoint generating address is read out from the breakpoint address latch 72. his allows effective data to be determined from the selected trace mode and the value of the address counter 67.

A result the trace stored in the trace memory 68 is dumped in the display portion 80 by the interface portion 40. The result of the trace is also filed by the interface portion 40, and which file is indicated as a list in the display portion 80.

As shown in FIG. 5, the display portion 80 is connected to the control computer 31. The display portion 80 may be connected to the external data storing portion (EDS) 22 shown in FIG. 5 by using the external data storing portion 22 as a video RAM. The display portion 80 may be connected to the trace memory 68 in the tracer portion 60 shown in FIG. 9 by using the trace memory 68 as a video RAM.

A plurality of trace portions 60 can be connected for one interface portion 40. For example, by providing 15 trace portions 60 for one interface portion 40, 15 portions of the processing element can be simultaneously measured. By performing traces at connection points of function portions at which operation packets, result packets and the like are obtained, an operation of the entire system can be comprehended together with the trace time information stored simultaneously.

As the foregoing, the data of each portion of the processing element 10 collected by the tracer portion 60 can be indicated by the display portion 80.

FIGS. 10A and 10B show examples of indications of a trace result. FIG. 10A shows an indication of the output of the function processing portion 13 and FIG. 10B shows an indication of the output of the external color/stack processing portion 23.

A data driven type processor is developed with a language processing system. Provided is a tool for schematically indicating and modifying a compiler outputting type file of the language processing system, object code which is a Mapper output, and a program with respect to a result of the executed trace. This enables a schematic indication of the object code and the result of the executed trace for each processor also in an environment in which a multiprocessor is executed. By comparing an object code and a result of the executed trace for each processor, non-processed nodes, non-supplied data packets, non-accessed memories and the like can be detected very easily, which facilitates debugging of the multiprocessor. In addition, a maximum parallelism, average parallelism, the number of ranks to be executed and execution time period during the execution can be indicated together with the time information, and operation rate can be easily estimated in the same manner as a result of an execution of a simulator.

Indication is performed by using, for example, a result of rank analysis required for giving the node numbers in the data exchanging system described in Japanese Patent Application No. 62-54406 (transfer storing apparatus and data driven type computer). In addition, with respect to an arc, the degree of perception thereof is improved by introducing the algorithm which reduces overlap.

The compiler outputting type file is schematically indicated on a function basis and which indication is generally clear when compared with a schematic indication of a Mapper output (object code) in which a plurality of functions are developed.

Figure 11:
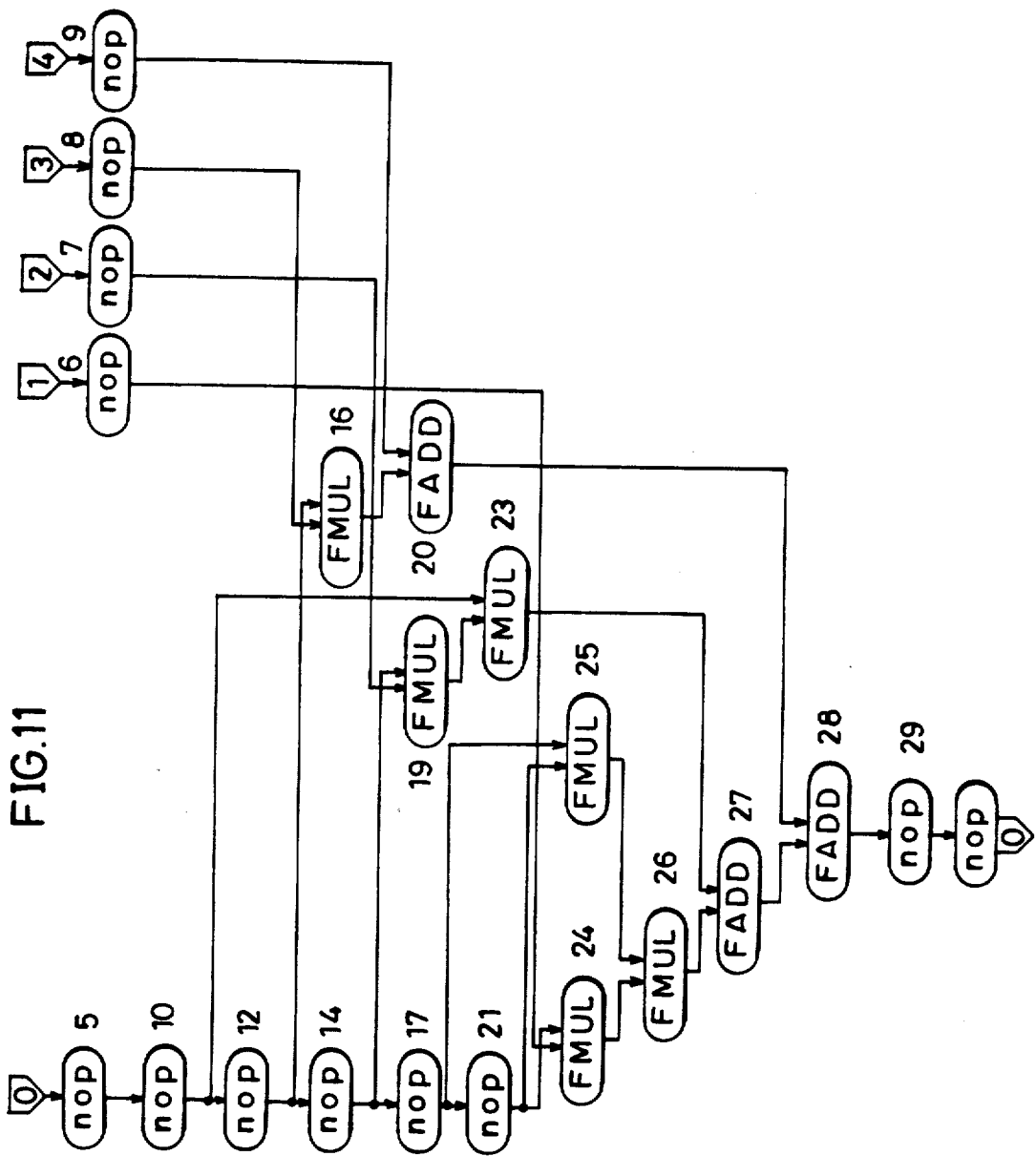
FIG. 11 is a diagram showing an example of a graphic display of a Mapper output, which is a data flow graph.
Figure 12:
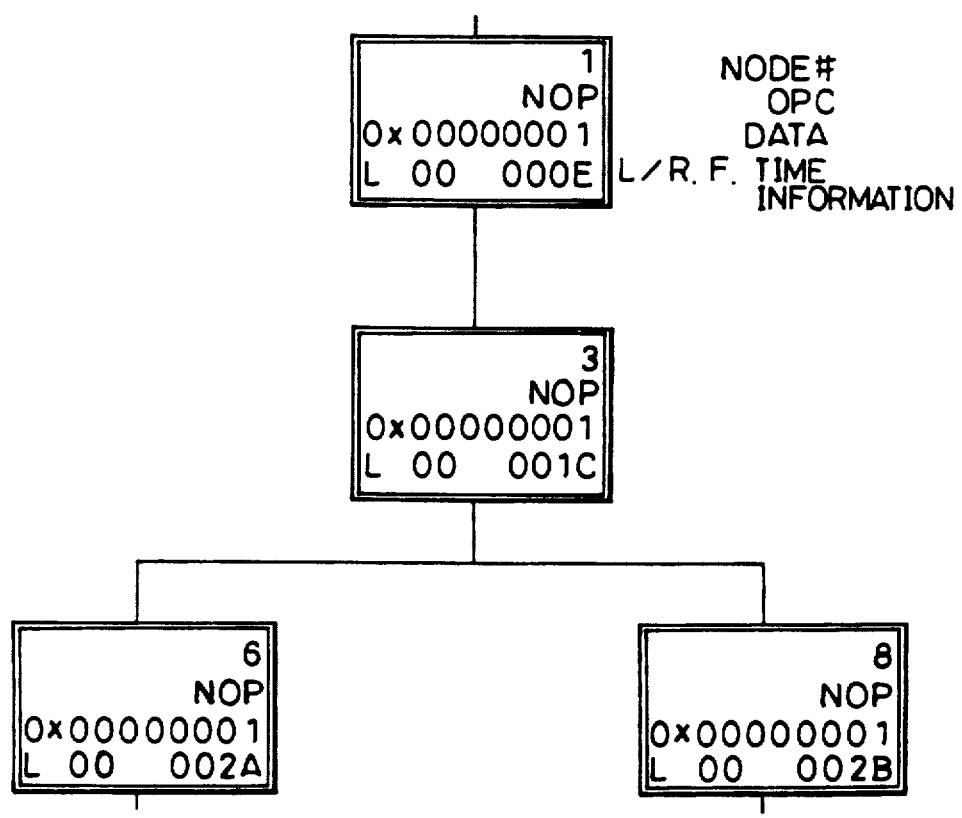
FIG. 12 is a diagram showing one example of a display of the result of the trace.

FIG. 11 shows an example indicating a Mapper output of the data flow graph of a cubic polynomial operation program. FIG. 12 shows an example of the indication of the trace result.

As described above, in the embodiment, a data packet to be processed is supplied to the processing element 10 of the parallel processor at a high speed from the control computer 31 through the interface portion 40 comprising the supply packet memory 50. In addition, the data packets inputted to the plurality of tracer portions 60 connected to the plurality of terminals of the processing element 10 are traced in synchronization with the internal clock of the system together with the common time information. The trace result stored in the plurality of tracer portions 60 are collected to be filed, which are further made into a data flow graph and displayed in the display portion 80. Accordingly, debugging in the hardware or the software in developing a parallel processor can be easily and rapidly performed.

While in the above described embodiments the developments supporting environment of the data driven type processor has been described, the above described embodiments are applicable to other parallel processing computers or processors as well.

Figure 13:
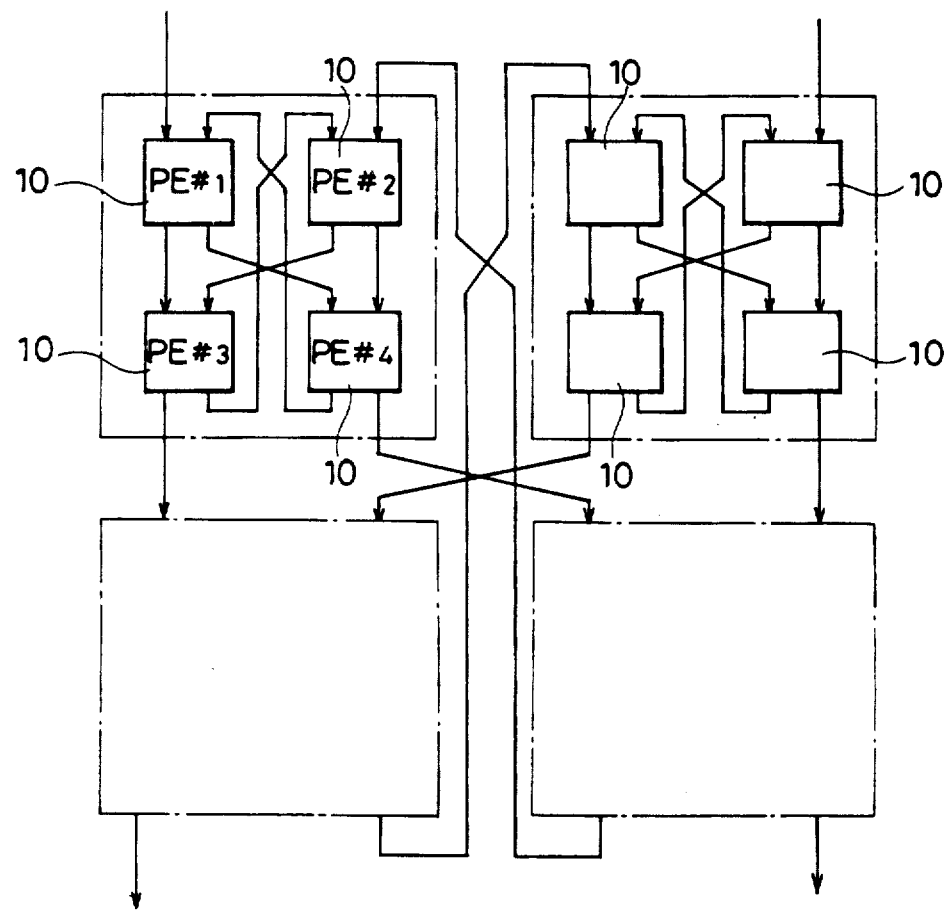
FIG. 13 is a diagram showing a shuffle net connection of the data driven type processor.
Figure 14:
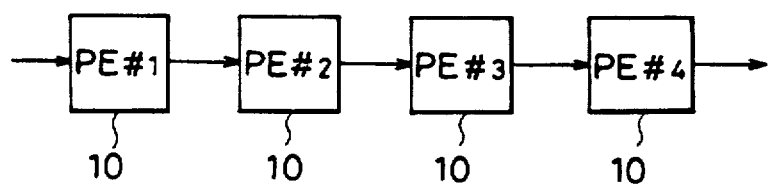
FIG. 14 is a diagram showing daisy chain connection of the data driven type processor.

In FIG. 5, a method of connecting the processing elements 10 is not specified. A method of connecting the processing elements may be shuffle net connection shown in FIG. 13, a daisy chain connection shown in FIG. 14 and other various connection.

Figure 15:
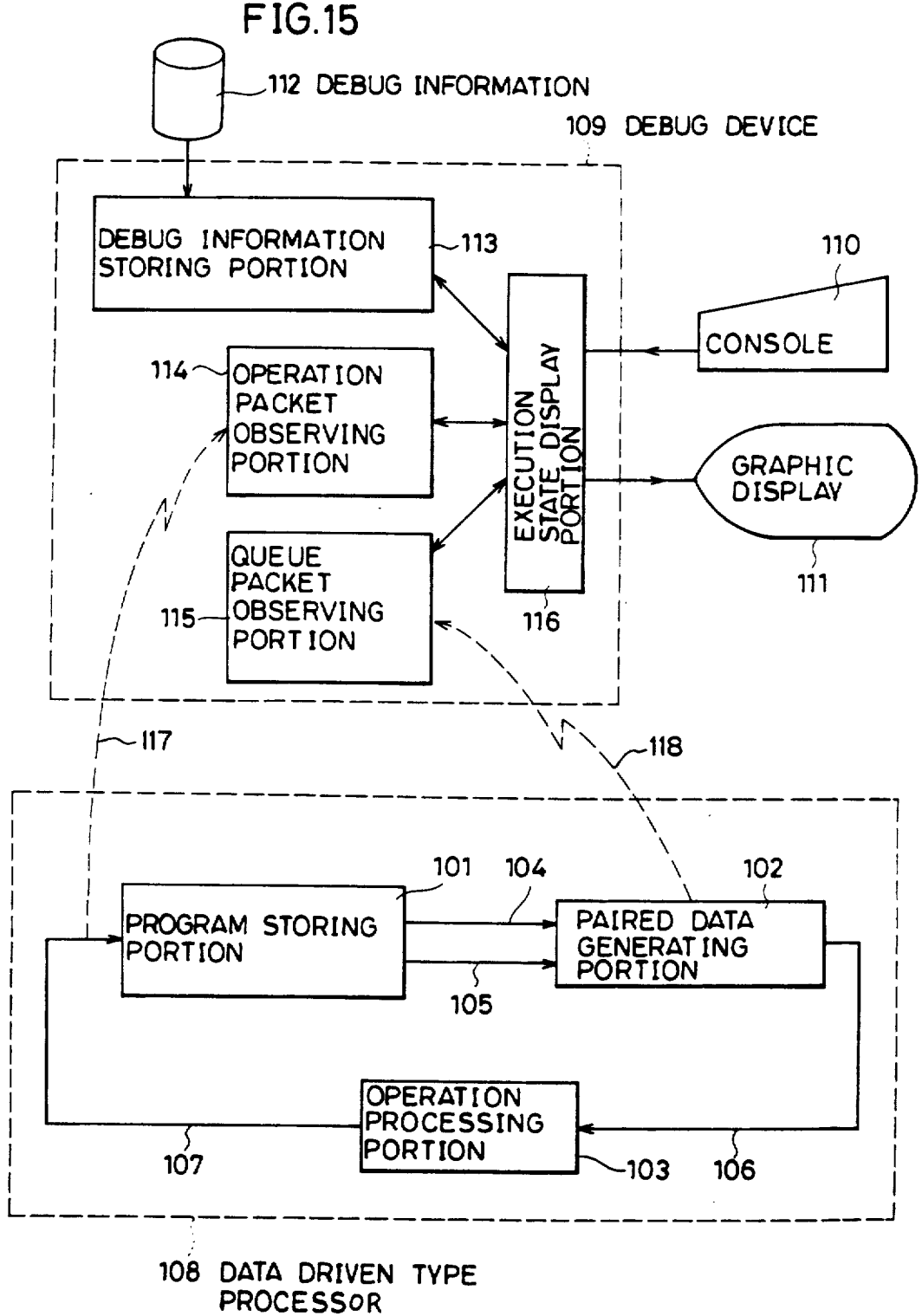
FIG. 15 is a block diagram schematically showing a structure of a debug device according to another embodiment of the present invention.

FIG. 15 is a block diagram showing a structure of the debug device according to another embodiment of the present invention. In FIG. 15, operations of a program storing portion 101, a paired data generating portion 102, an operation processing portion 103 and data transmission paths 104, 105, 106 and 107 are the same as those of the corresponding portions of the data driven type processor of FIG. 1. The debug device 109 includes a debug information storing portion 113, an operation packet observing portion 114, a queue packet observing portion 115 and an execution state display portion 116. Connected to the debug device 109 are an operation packet observation path 117, a queue packet observation path 118, a console 110 and a graphic display 111.

Figure 2:
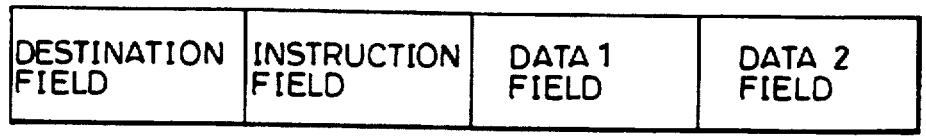
FIG. 2 is a diagram showing a field structure of a data packet circulating in the data driven type processor of FIG. 1.
Figure 3:
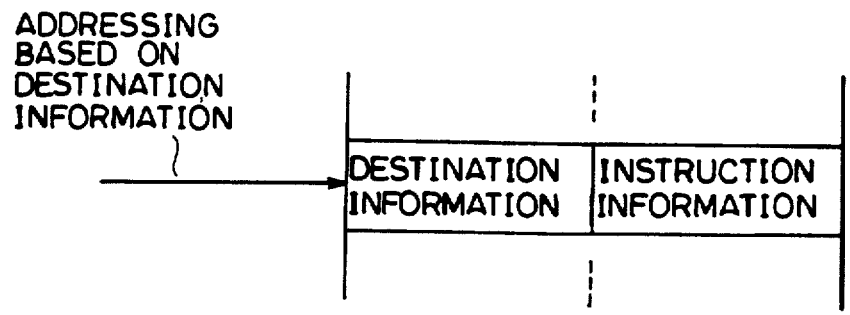
FIG. 3 is a diagram showing a field structure of the storage contents of a program storing portion in the data driven type processor.
Figure 4:
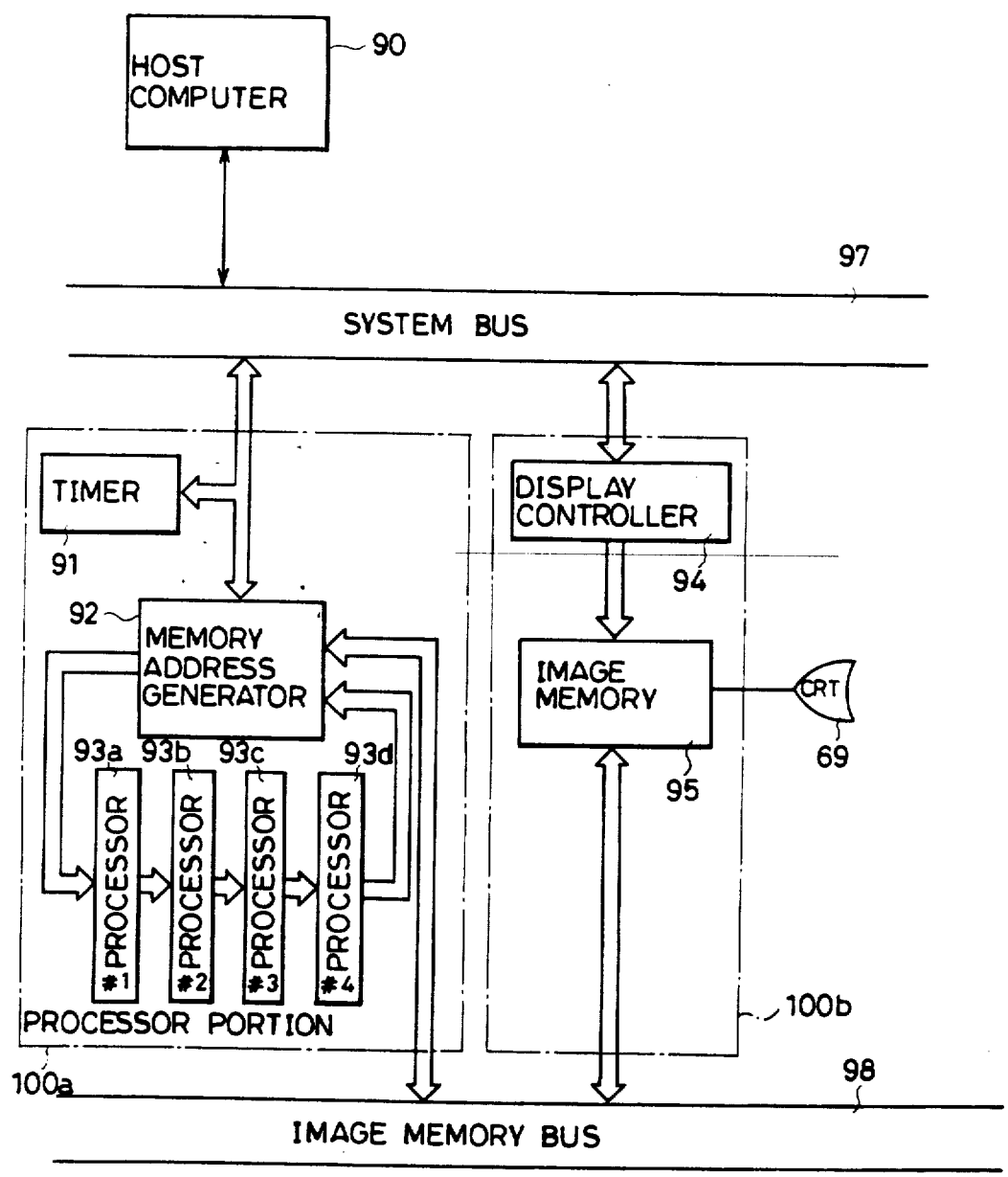
FIG. 4 is a block diagram showing a structure of a conventional parallel processor developing system.

The operation packet observing portion 114, one element of the debug device 109, is connected to the data transmission path 107 through the operation packet observation path 117. The operation packet observing portion 114 observes the contents of the destination field and the data 1 field of the data packet having the field structure as shown in FIG. 2, as the information concerning the data packet passing through the data transmission path 107 (referred to as operation packet hereinafter). The observed information is given the time of observation of the data packet as the time information, and sequentially stored in the operation packet observing portion 114 as the data having the field structure shown in FIG. 16 in the order of the observation.

The queue packet observing portion 115, another element of the debug device 109, is connected to the paired data generating portion 102 through the queue packet observation path 118. The queue packet observing portion 115 observes the contents of the destination field and the data 1 field of the data packet having the field structure shown in FIG. 2, as the information concerning a group of the data packets queuing data packets (referred to as queue packet hereinafter) to be paired in the paired data generating portion 102. The observed information is given the time of observation of the group of the data packets as the time information, and sequentially stored in the queue packet observing portion 115 as the data having the field structure shown in FIG. 16 in the order of the observation.

While operation packets are observed every time a data packet passes through the data transition path 107, queue packets are observed in response to command inputs from the console 110.

The debug information storing portion 113, still another element of the debug device 109, stores debug information 112. The debug information 112 includes a corresponding relation between the source program and the data flow program which is obtained by developing the source program, and information concerning the data flow program stored in the program storing portion 101.

FIG. 17 shows the source program described in sequential languages. The source program is developed into the data flow program, and thereafter stored in the program storing portion 101 to be executed on the data driven type processor 108.

Since the data flow program is also stored in the debug information storing portion 113 in the debug device 109, the data flow program can be schematically described on the graphic display 111.

In addition, since the debug information storing portion 113 stores the data flow program and the corresponding relation of the source program and the data flow program as the debug information 112, it will be possible to correspond a name of each variable in the source program with an operation for updating the variable in the data flow program. According, the execution state displaying portion 116 in the debug device 109 is capable of drawing the data flow graph shown in FIG. 18 on the graphic display 111.

Figure 18:
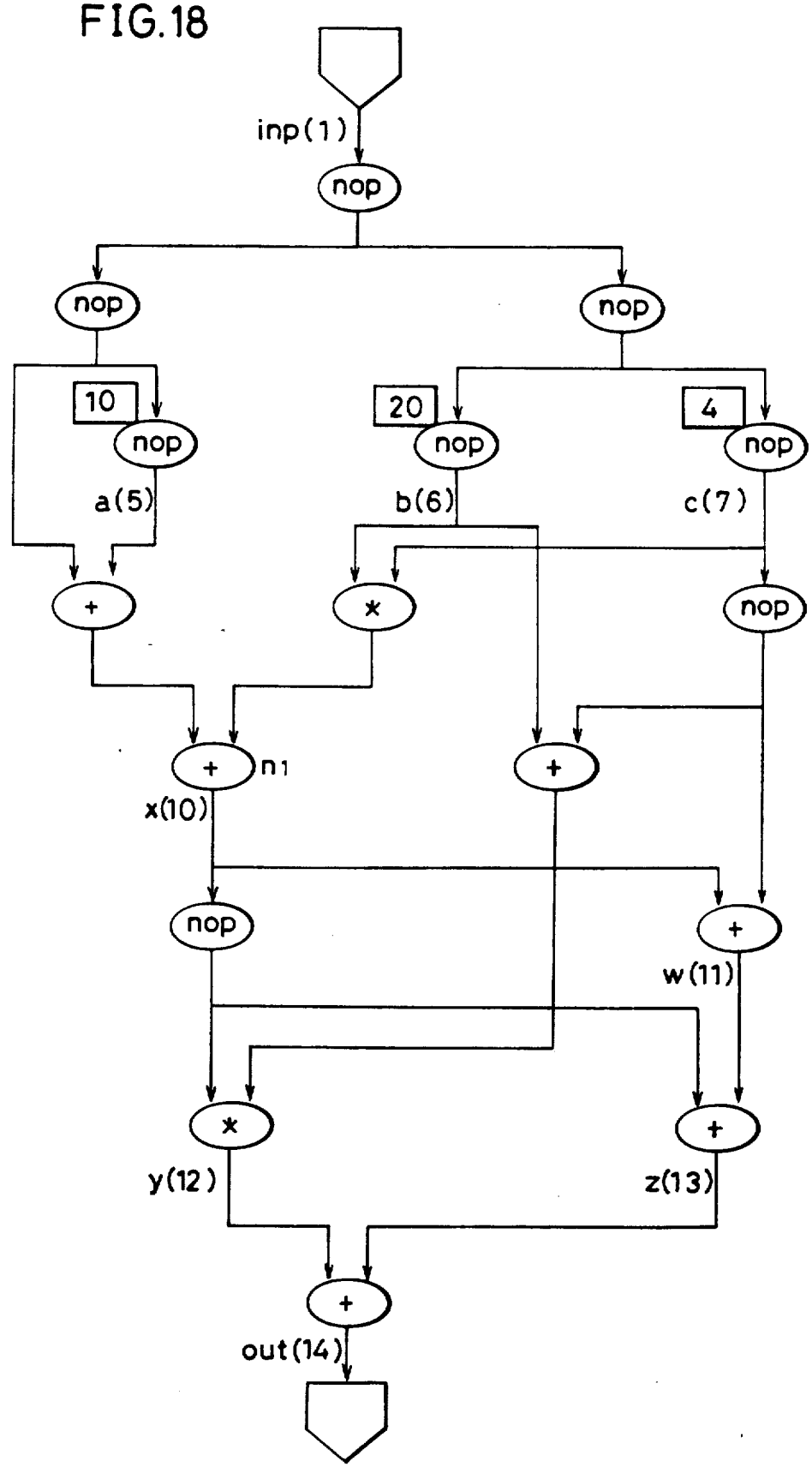
FIG. 18 is a diagram showing a corresponding relation between a source program and a data flow program.

In FIG. 18, symbols such as x (10) indicated at the lower left of the node showing the operation indicate a name of a variable and a row number in which a value of the variable is updated in the source program. For example, x (10) indicated at the lower left of the adding operation of the node n1 indicates that a value of the variable x is determined through the execution of the adding operation and that updating of the value of the variable x is described in the tenth row in the source program. The debug device 109 schematically draws such data flow graph as shown in FIG. 18 on the graphic display 11, so that a corresponding relation between the source program and the data flow program can be easily comprehended.

After the data is inputted to the data driven type processor 108, at the time when the execution of the data flow program is completed, the destination information of all the packets to which operations have been performed, that is, a corresponding relation between the observed operation packets and each node in the data flow program, data value of the operation result, and the time when an operation packet passes on the data transmission path 107, are stored in the operation packet observing portion 114 in the debug device 109 in accordance with the field structure shown in FIG. 16. The execution state displaying portion 116 in the debug device 109, as shown in FIG. 19, overlaps the information with the data flow graph shown in FIG. 18 to draw an execution state of the data driven type processor 108 on the graphic display 111.

Figure 19:
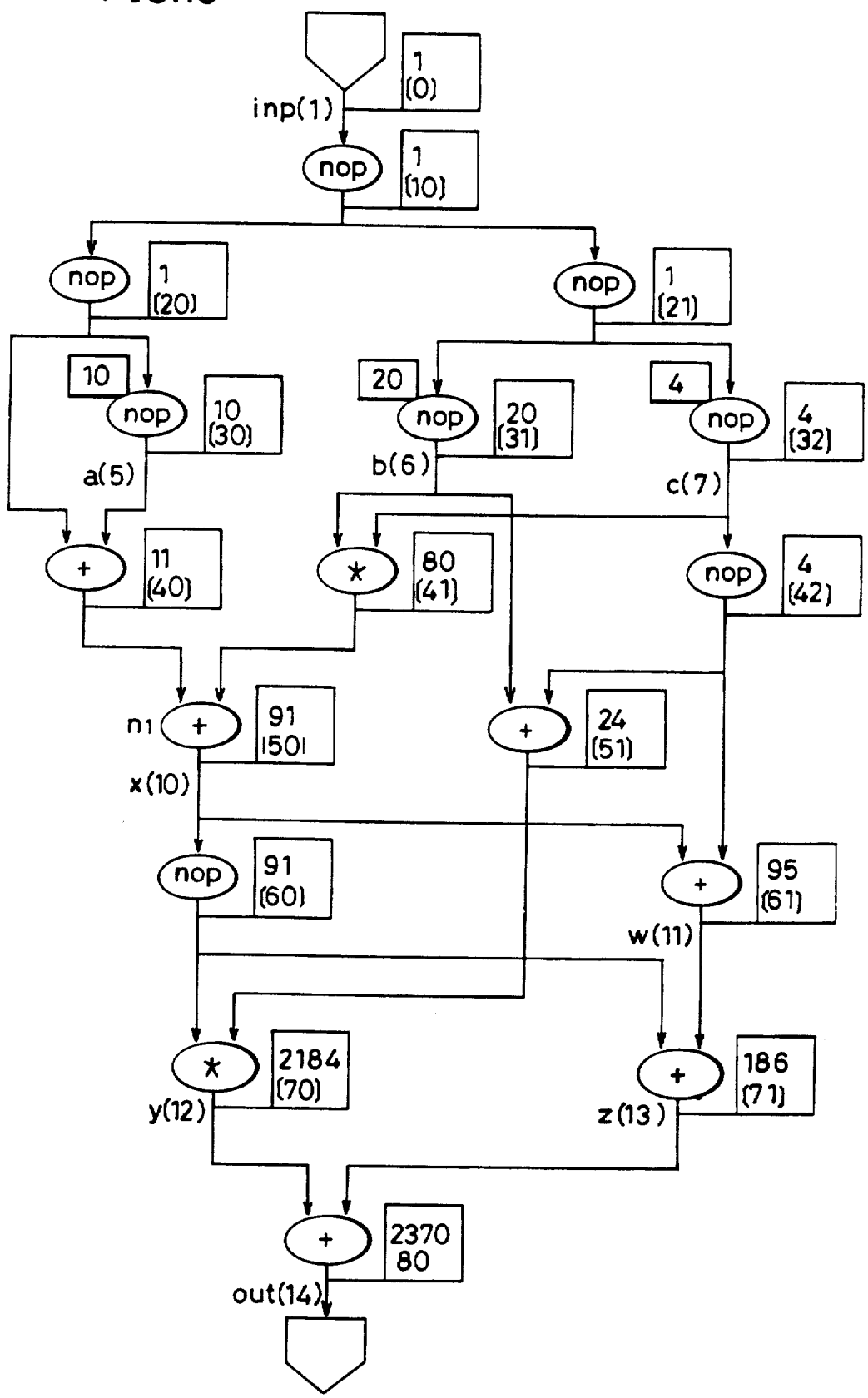
FIG. 19 is a diagram showing an execution state in which the data flow program shown in FIG. 18 is executed on a data driven type processor.

FIG. 19 shows an execution state in which data 1 is inputted at the time 0. In FIG. 19, numerals in the upper rows in the rectangles denote data values of the operation packets and numerals in brackets in the lower rows denote the time when the operation packets pass through the data transmission path 107. Taking as an example the variable x whose value is updated in the tenth row in the source program, it will be clear from the indication regarding the node n1 that the operation is finished at the time 50 and the value of the variable X is 91 in the execution on the data driven type processor 108.

As shown in FIG. 19, the debug device 109 schematically displays the execution state of the data flow program on the graphic display 111, so that logical error of the source program can be easily detected. In addition, at the stage of developing the data driven type processor 108, even when an operation result is not collected due to a hardware flow of the operation processing portion 103, the error of the operation processing portion 103 can be detected by confirming the value of input/output of each node of FIG. 19.

Assuming that the execution of the data flow program is not completed even though the data is inputted to the data driven type processor 108. The causes for this are broadly divided into those of software due to a description of the source program itself or errors in the development from the source program to the data flow program and those of hardware caused by the data driven type processor itself. Whether the cause is of software or of hardware, an operation error with respect to the operation processing portion 103 can be, as the foregoing, specified only by observing an operation packet passing through the data transmission path 107.

However, it is difficult to specify causes of errors of hardware resulted from the program storing portion 101 or the paired data generating portion 102 just by observing operation packets.

In such a case, by observing data packets queueing data packets to be paired in the paired data generating portion 102 to schematically display a queue state, important information for specifying the causes of the error is presented.

If the execution of the data flow program is not completed even though the data is inputted to the data driven type processor 108, the information regarding the operation packets passing through the data transmission path 107 is stored in the operation packet observing portion 114 in the debug device 109 in accordance with the field structure shown in FIG. 16.

In addition, the queue packet observing portion 114 is capable of storing the information regarding the data packets queuing data packets to be paired in the paired data generating portion 102 in accordance with the field structure shown in FIG. 16.

Figure 20:
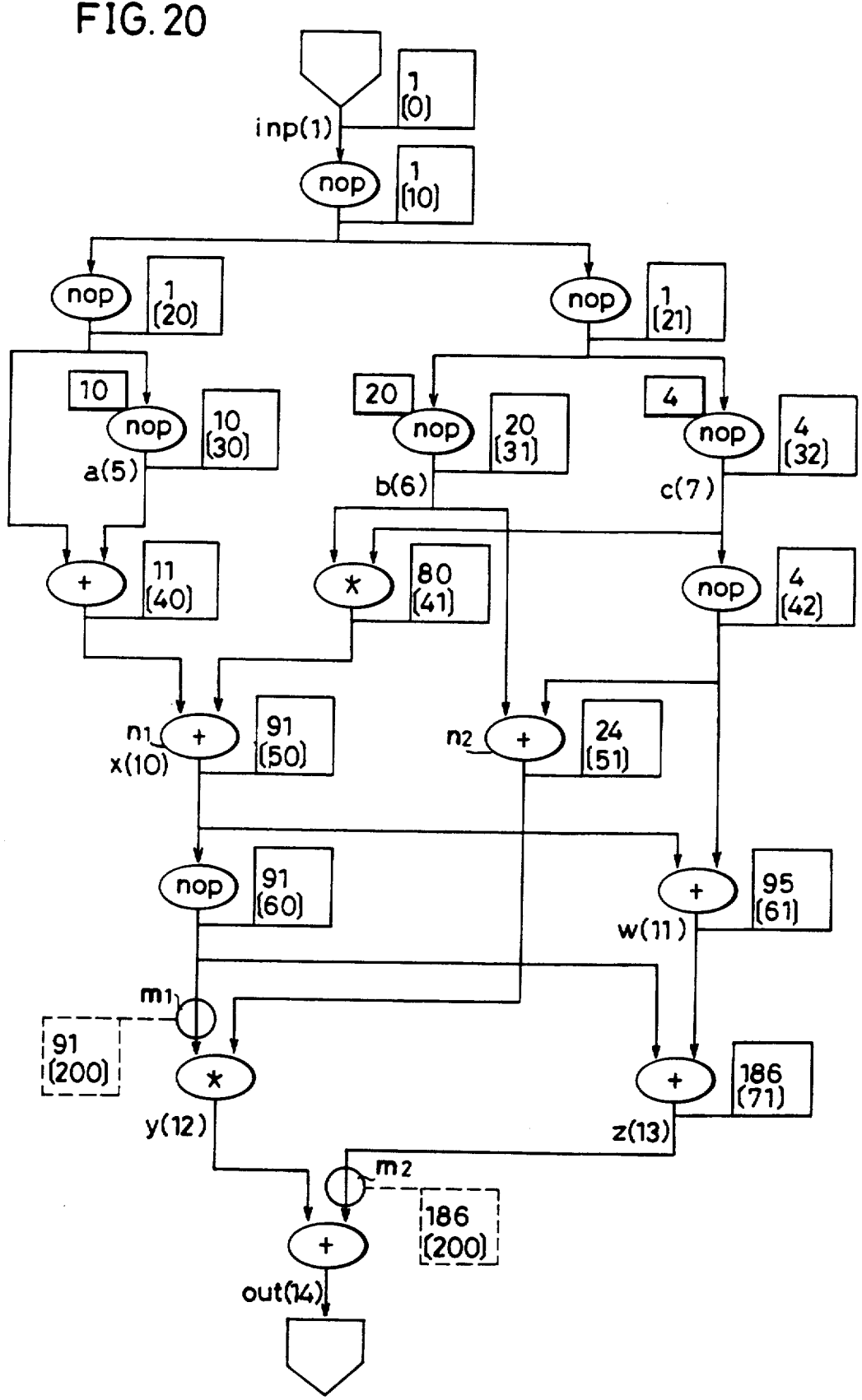
FIG. 20 is a diagram showing an execution state and a state of queue of a data packet in a paired data generating portion when the data flow program shown in FIG. 18 is executed on the data driven type processor.

The execution state displaying portion 116, as shown in FIG. 20, is capable of drawing an execution state of the data driven type processing 108 and a queuing state of the data packet in the paired data generating portion 102 on the graphic display 111 such that they overlap the data flow graph shown in FIG. 18 by using the information stored in the operation packet observing portion 114 and the queue packet observing portion 115.

FIG. 20 shows an execution state in which the execution of the data flow program is not completed even though data 1 is inputted at the time 0, and queuing state of the data packet of the paired data generating portion 102 at the time 200. In FIG. 20, as in the case of FIG. 19, numerals in the upper rows of the rectangles indicted by the solid line denote data values of the operation packets and numerals in the brackets in the rectangles denote the time when the operation packets pass on the data transmission path 107. Meanwhile, since the execution of the data flow program is not completed, the indication of the operation packets are performed halfway of the data flow program.

In FIG. 20, m1, m2 and the numerals in the rectangles shown by the dotted line denote queuing state of the data packets of the paired data generating portion 102 at the time 200. The numerals in the upper rows in the rectangles shown by the dotted line denote data values of queue packets and the numerals in the brackets in the lower rows in the rectangles denote the time of the observation of the queue packets.

It can be seen from FIG. 20 that the execution of the data flow program is not finished because a value of the variable y is not fixed which value is to be updated in the twelfth row of the program.

On the other hand, in order to obtain y, an operation (b+c) should be performed. It is clear from FIG. 20 that a value of (b+c) is obtained as 24 at the time 51 at the node n2.

As the foregoing, it can be seen from FIG. 20 that even though the operation packet indicating the operation result of (b+c) has passed through the data transmission path 107 at the time 51, the operation packet has not properly processed in the program storing portion 101 or the paired data generating portion 102 and disappeared. As shown in FIG. 20, the debug device 109 schematically displays the execution state of the data flow program and queuing state of the data packet in the paired data generating portion 102 on the graphic display 111, so that causes of hardware defeated from the data driven type processor itself under development and software defects can be distinguished, thereby allowing the provision of the important information for specifying where the error exists.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel processor development system comprising:
    parallel processing means including a plurality of function portions and ports provided at predetermined points in said plurality of function portions for processing data packets,
    controlling means for controlling said parallel processing means and supplying data packets to be processed by said parallel processing means,
    inputting means for storing the data packets supplied by said controlling means and inputting said data packets to said parallel processing means at a predetermined time interval,
    a plurality of tracing means connected to a plurality of said ports of said parallel processing means for storing data packets taken from said plurality of said ports together with common timing information, and
    displaying means for displaying storage contents of said tracing means.

2. A parallel processor developing system according to claim 1, wherein said parallel processing means comprises more than two processors.

3. A parallel processor developing system according to claim 2, wherein each said processor is a data driven type processor for executing a data flow program.

4. A parallel processor developing system according to claim 3, wherein said data driven type processor comprises:
    program storing means for storing a data flow program and outputting a data packet based on said data flow program,
    paired data generating means for detecting two data packets to be paired, and
    operation processing means for subjecting a data packet outputted form said paired data generating means to a specified processing operation.

5. A parallel processor developing system according to claim 1, wherein said inputting means comprises:
    first storing means for storing data packets supplied from said controlling means, and
    measuring means for inputting said data packets stored in said first storing means to said parallel processing means at a predetermined time interval.

6. A parallel processor developing system according to claim 5, wherein said inputting means further comprising microprocessor means for controlling said first storing means and said measuring means.

7. A parallel processor developing system according to claim 6, wherein said first storing means comprises:
    first memory means for storing a plurality of data packets,
    writing addressing means for addressing to write said data packets supplied from said controlling means into said first memory means, and
    reading addressing means for addressing to read out a data packet stored in said memory means.

8. A parallel processor developing system according to claim 7, wherein said measuring means comprises:
    output port means for applying said data packet read out from said first storing means to said parallel processing means, and
    output port controlling means for driving said output port means based on information regarding said predetermined time interval supplied from said microprocessor means.

9. A parallel processor developing system according to claim 1, wherein each said tracing means comprises:
    timer means for generating said common timing information,
    second storing means for storing said data packets taken from any of said ports together with said common timing information, and
    read/write controlling means for controlling reading operation and writing operation of said second storing means.

10. A parallel processor developing system according to claim 9, wherein said second storing means comprises:
    third means for storing a plurality of data packets together with said common timing information,
    addressing means for addressing said memory means, and
    breakpoint means having a present breakpoint value and which stops an operation of said tracing means upon detection of a data packet having the same value as the breakpoint value.

11. A parallel processor developing system according to claim 1, wherein said displaying means has a function of displaying data packets processed in said parallel processing means in a predetermined order as said data packets are processed and a function of comparing said data packets with a program to be executed.

12. A parallel processor developing system according to claim 11, wherein said displaying means has a function of collecting a plurality of trace results from said tracing means, storing said trace results, arranging the stored trace results into a data flow graph and displaying the data flow graph.

13. A debug device for a data driven type processor including program storing means for storing a data flow program and outputting a data packet based on said data flow program, paired data generating means for detecting two data packets to be paired and operation processing means for subjecting a data packet outputted from said paired data generating means to a specified operation processing, comprising:
- debug information storing means for storing debug information regarding said data flow program,
- operation packet observing means for observing a data packet which has been subjected to an operation processing in said operation processing means,
- queue packet observing means for observing data packets queuing data packets to be paired in said paired data generating means, and
- execution state displaying means for schematically displaying an execution state of said data driven type processor based on said debug information stored in said debug information storing means and observed information obtained from said operation packet observing means and said queue packet observing means, said execution state observing means being operatively connected to said queue packet observing means, said operation packet observing means and said debug information storing means.

14. A parallel processor developing system according to claim 13, wherein said debug information includes information regarding a corresponding relation between the source program and a data flow program obtained by developing the source program and information regarding said data flow program stored in said program storing means.

15. A parallel processor developing system according to claim 14, wherein said execution state displaying means displays a data flow graph based on a corresponding relation between the source program and the data flow program stored in said debug information storing means.

16. A parallel processor developing system according to claim 15, wherein said operation packet observing means stores destination information, operation result information and time information of all data packets to which operations are performed by said operation processing means.

17. A parallel processor developing system according to claim 16, wherein said execution state displaying means displays an execution state of said data driven type processor on said data flow graph based on said information stored in said operation packet observing means.

18. A parallel processor developing system according to claim 17, wherein said queue packet observing means stores destination information, data information and time information of data packets queuing data packets to be paired in said paired data generating means.

19. A parallel processor developing system according to claim 18, wherein said execution state displaying means displays an execution state of said data driven type processor and queuing states of the data packets in said paired data generating means on said data flow graph based on said information stored in said operation packet observing means and said information stored in said queue packet observing means.

20. A parallel processor developing system according to claim 13, wherein said program storing means stores a data flow program comprising a plurality of destination information and a plurality of instruction information, inputs a data packet including the destination information, the instruction information and data, reads the next destination information and instruction information from said data flow program in accordance with the destination information of the inputted data packet, and stores the destination information and the instruction information into said data packet and outputs the same,
- said paired data generating means queues said data packets outputted from said program storing means and stores one of data packets of the two data packets having the same destination information into the other data packet and outputs the other data packet,
- said operation processing means encodes the instruction information of the data packets outputted from said paired data generating means, performs a specified operation processing to one or two data of said data packets, stores the result in the data packet and outputs the same.

21. A method of developing a parallel processor, comprising the steps of:
- supplying data packets to be processed by said parallel processor,
- storing said supplied data packets externally of said parallel processor,
- inputting said stored data packets into said parallel processor at a predetermined time interval,
- taking data packets from predetermined portions of said parallel processor and storing externally of said parallel processor the data packets together with information regarding said predetermined time interval, and
- displaying said data packets stored together with said time information.

* * * * *